C. HOSKING.
TWO WHEELED DRAFT VEHICLE.
APPLICATION FILED JAN. 26, 1920.

1,396,754.

Patented Nov. 15, 1921.
5 SHEETS—SHEET 1.

INVENTOR
Charles Hosking
By Hubert A. Gill
Attorney

C. HOSKING.
TWO WHEELED DRAFT VEHICLE.
APPLICATION FILED JAN. 26, 1920.

1,396,754.

Patented Nov. 15, 1921.
5 SHEETS—SHEET 2.

Charles Hosking INVENTOR

By Hubert A. Gill
Attorney

C. HOSKING.
TWO WHEELED DRAFT VEHICLE.
APPLICATION FILED JAN. 26, 1920.

1,396,754.

Patented Nov. 15, 1921.
5 SHEETS—SHEET 3.

INVENTOR
Charles Hosking,
By Hubert A. Gill
Attorney

C. HOSKING.
TWO WHEELED DRAFT VEHICLE.
APPLICATION FILED JAN. 26, 1920.

1,396,754.

Patented Nov. 15, 1921.
5 SHEETS—SHEET 4.

INVENTOR
Charles Hosking
By Hubert A. Gill
Attorney

C. HOSKING.
TWO WHEELED DRAFT VEHICLE.
APPLICATION FILED JAN. 26, 1920.

1,396,754.

Patented Nov. 15, 1921.
5 SHEETS—SHEET 5.

INVENTOR
Charles Hosking
By Hubert G. Gill
Attorney

UNITED STATES PATENT OFFICE.

CHARLES HOSKING, OF BELGRAVIA, JOHANNESBURG, SOUTH AFRICA.

TWO-WHEELED DRAFT-VEHICLE.

1,396,754.

Specification of Letters Patent. Patented Nov. 15, 1921.

Application filed January 26, 1920. Serial No. 354,236.

*To all whom it may concern:*

Be it known that I, CHARLES HOSKING, a subject of the King of Great Britain, and residing at 458 Marshall street, Belgravia, Johannesburg, South Africa, have invented certain new and useful Improvements in Two-Wheeled Draft-Vehicles, of which the following is a specification.

This invention relates to two-wheeled draft vehicles, and it has for its object the provision of means whereby when the brake is operated the vehicle body is prevented from pressing down on the animal, such as a horse, drawing the vehicle. This object is attained according to the present invention by providing the vehicle axle with two axes in different planes, one about which the vehicle body can turn and the other around which the wheels rotate, the relative positions of the two axes being that when the brake is put on the wheel axle tends to turn and lift the vehicle body with it, so that instead of the reaction due to applying the brakes being transmitted to the horse, it is balanced by the weight of the vehicle body. Other features of the present invention which are employed in carrying into effect the inventive concept above set forth will be apparent from the following description and will be pointed out in the claims at the end thereof.

The accompanying drawings show examples of construction according to the present invention. In the said drawings:—

Figure 1:
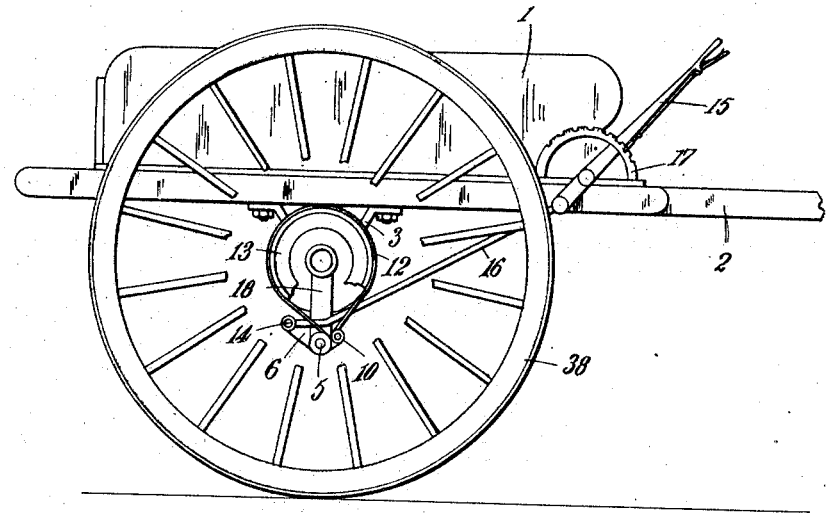
Figures 1 and 2 are a side and front view respectively of a vehicle according to the present invention.
Figure 2:
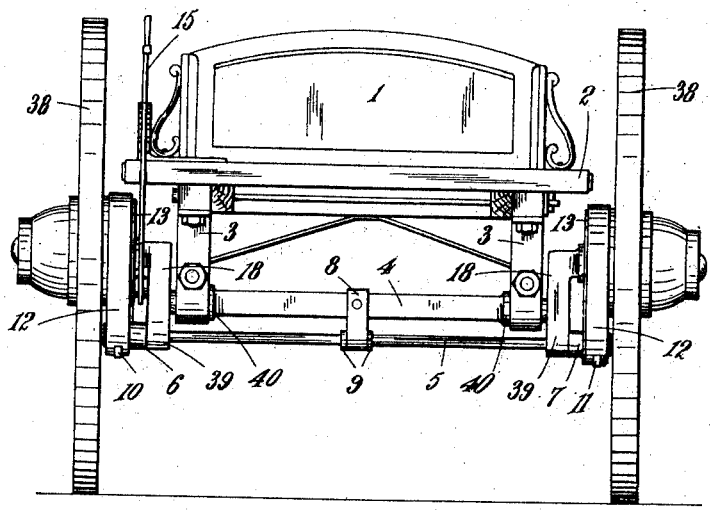
Figure 3:
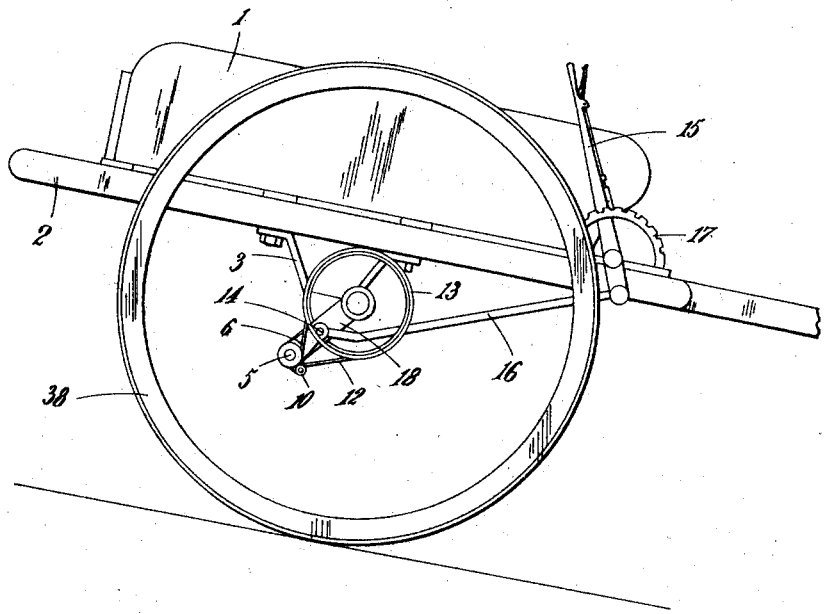
Fig. 3 is a side view of the same vehicle with the brakes operating while going down a hill.

Referring first to Figs. 1 to 5 of the drawings,

The body 1 and framework 2 of the cart rests on pedestals 3 secured to the framework. The pedestals 3 in turn are journally mounted on the axle 4, collars 40 being formed on the axle to prevent side-play. The axle 4 is cranked at each end as at 18, the cranked portions having downward extensions 39 which are adapted to support a rocking shaft 5. This rocking shaft rocks freely in its supports and extends beyond said supports in order to receive a double-armed lever 6 on the one end, and a single-armed lever 7 on the other end. These levers are keyed to the shaft 5. The rocking shaft 5 is prevented from moving longitudinally by passing it through a hanger 8 secured to the axle 4 and mounting collars 9 on the said shaft on either side of the hanger. Lugs 10 and 11 are formed on the lever arms 6 and 7 respectively, in order to take one each of the ends of the steel bands 12 which pass around the brake drums 13 fastened to the hubs of the wheels 38. The end 14 of the double-armed lever 6 is connected to a hand lever 15 by means of a connecting rod 16. The lever 15 has a spring bolt attachment, which engages with a notched segment 17, and this serves to secure the lever in any desired position.

Figure 4:
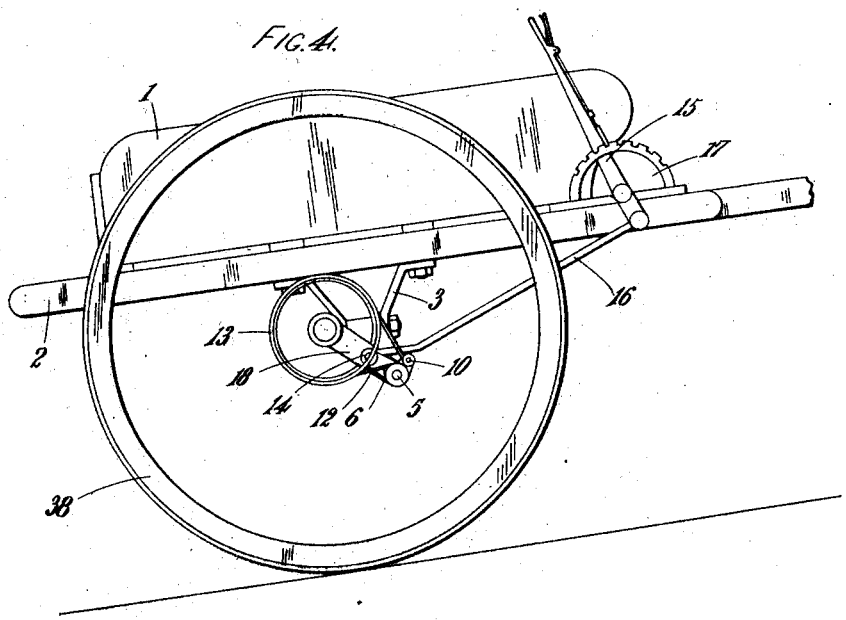
Fig. 4 is a side view of the same vehicle with the brakes operating so as to prevent the vehicle from backing down hill.
Figure 5:
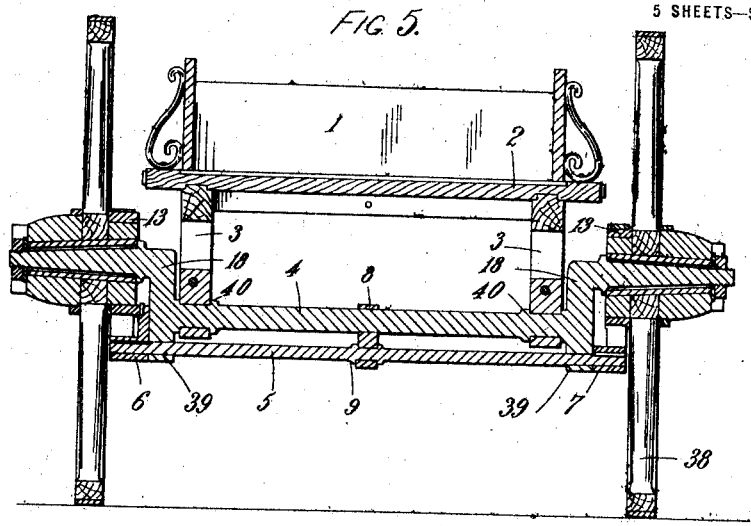
Fig. 5 is a sectional view of Fig. 2.

In applying the brake on a down-grade, the lever 15 is drawn back and pulls forward the end 14 of lever 6, thus causing the lug 10 to move and pull the brake band 12 into contact with the brake drum 13. Similar movement takes place by means of the rocker shaft 5 simultaneously on the other side of the vehicle. The result of this braking action is that the wheel in moving forward tends to carry the crank 18 with it, so that the body of the vehicle is lifted to a height depending on the pressure exerted on the brake bands and the inclination of the hill, and as the vehicle body is journally mounted on the cart axle 4, the horse sustains no extra load. In an up grade when the brake is applied for the purpose of preventing the vehicle from moving backward, the axle 4 is thrown forward as shown in Fig. 4, as the wheel tends to move backward, until a state of equilibrium is reached, when the wheel comes to rest.

In the brake-operating mechanism shown in Figs. 1 to 4 for a given load, the amount of braking applicable to the wheels depends on the position of the lever 6 when the brakes have been applied with relation to the axis of the vehicle axle 4. In the drawings the distance between the axis of the shaft 5 and that of the vehicle axle 4 is equal to the virtual length of the lever 6, so that when the extremity of the lever 6 coincides with the axis of the wheel axle the amount of braking pressure applicable without any tendencies to strain parts is at its maximum. For positions to the left of the crank 18 as shown in Fig. 1, the lifting action due to applying the brakes tends to release the brakes, while for positions to the right of the crank 18 the lifting action tends to jam the brakes. The brake should be so adjusted therefore, that when the maximum pressure is being exerted, the lever 6 should be slightly to the left of the crank 18. From the foregoing it follows that the greater the load in the vehicle body the greater will be the pressure applicable at the brake bands, so that by this example of the present invention an automatic brake pressure regulation is obtained.

Figure 7:
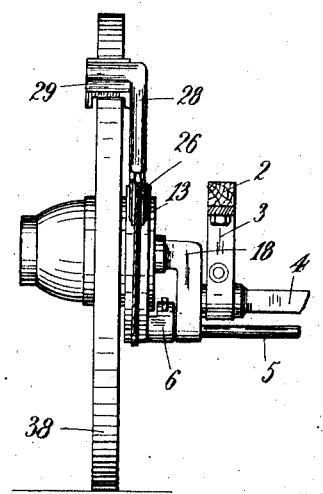
Figs. 6 and 7 are partial side and back views respectively of a brake mechanism according to the present invention suited for heavy work.
Figure 6:
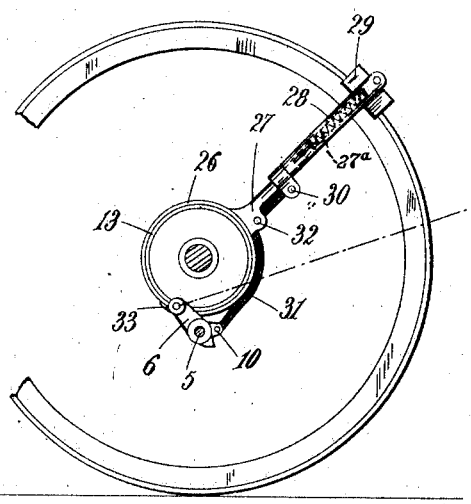

Figs. 6 and 7 show a brake according to the present invention designed for heavy work. A strong hoop 26 is loosely mounted on the drum 13. This hoop has an arm 27 running into a sleeve 28. On top of the arm 27 and inside the said sleeve is a spring 27ª which tends to force the arm away from the wheel band. This sleeve has connected to it by a strong bolt an iron shoe 29. A slot in the sleeve 28 and a pin in arm 27 prevent the sleeve from turning. At the bottom of hoop 26 a lug is formed through which the end of shaft 5 passes, this lug serving to prevent the hoop 26 from turning when the brake is applied. A lug 30 is arranged at the lower end of the sleeve 28, and a steel cable 31 is attached thereto, the other end being threaded over a shaped roller 32 and then connected to the lug 10 on the lever arm 6. To operate the brake, the hand lever (not shown) is drawn back as in Fig. 3. This brings the arm 6 forward and causes the sleeve 28 and brake block 29 to be drawn down by means of the cable 31 and lug 10: this puts on the brake. When the brake lever is released the spring inside sleeve 28 pushes the brake block 29 away from the wheel. The arm 6 when thrown back forces a lug 33 to serve as a stop limiting the backward turning movement of hoop 26. It will be seen that the principle of lifting the vehicle body is exactly the same as in the previous examples.

Figure 8:
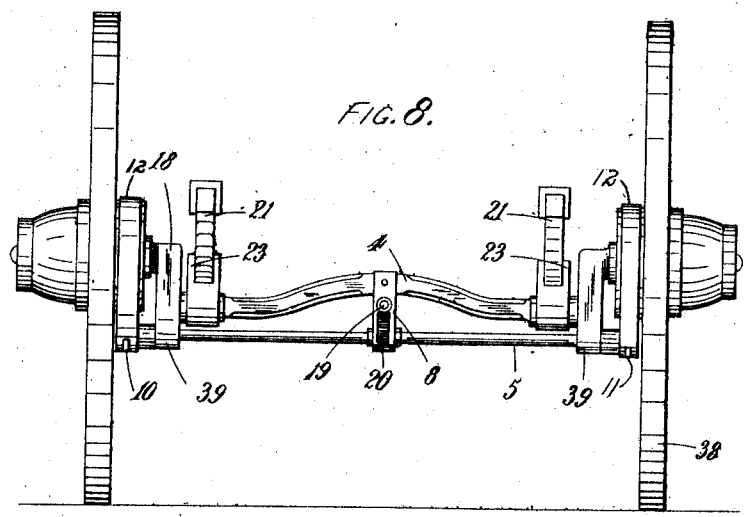
Figs. 8 and 9 are a back and side view respectively of a spring suspended two-wheeled vehicle having the brakes operated by means of worm gear.
Figure 9:
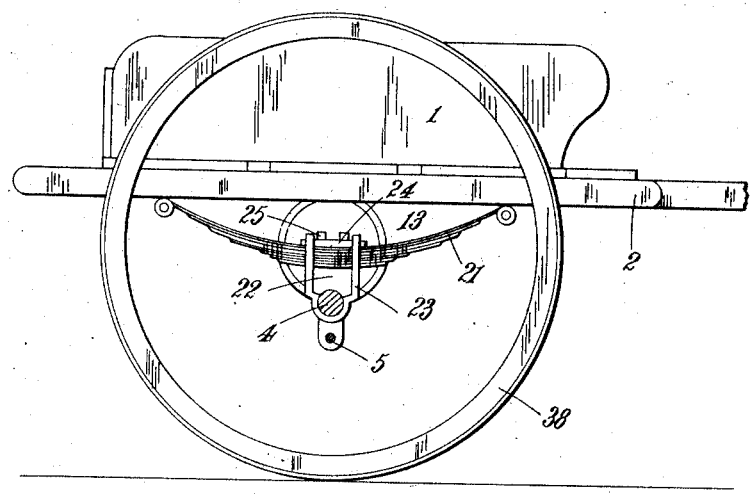

Figs. 8 and 9 show a modified form of the vehicle. As shown in Fig. 8 the brakes are operated by means of worm gearing 19, 20, imparting the turning movement to the shaft 5, the worm gearing being supported on the hanger 8, while braking movement is transmitted from a wheel or handle near the driver's seat, for instance, by means of a flexible cable and universal joint.

Figure 10:
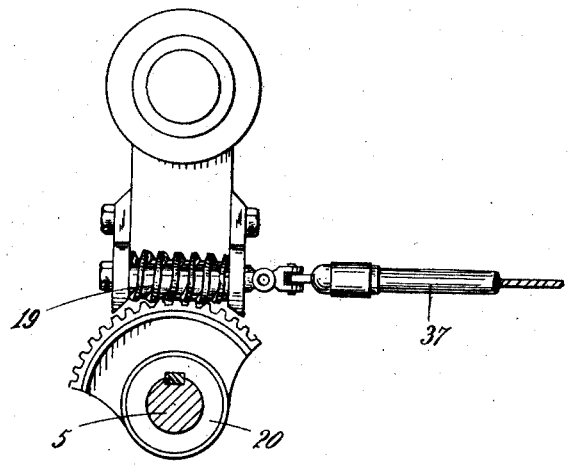
Figs. 10 and 11 are further detail views on a larger scale of the worm operated brake mechanism.
Figure 11:
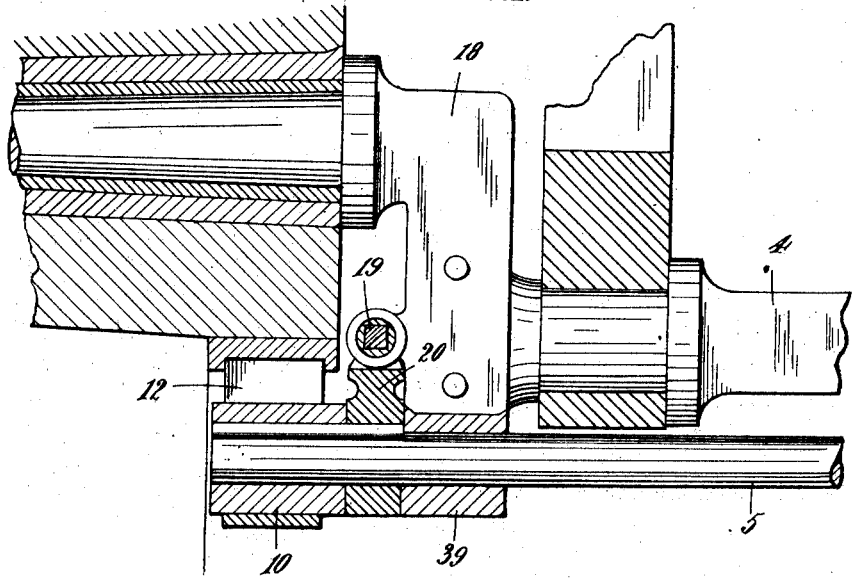

Figs. 10 and 11 are enlarged views showing another method of arranging the worm-operated brake gear. In this case the worm 19 is carried on a projection of the crank 18 at one end of axle 4, while the worm sector 20 with which it engages, is keyed on one end of the shaft 5. This shaft may operate the brake band 12 through a lug 10 as before. The flexible shaft 37 for operating the worm 19 is indicated in Fig. 10.

Having thus described my invention what I claim as new and desire to secure by Letters Patent is:—

1. In a two-wheeled draft vehicle, the combination with the vehicle of an axle having two axes, means supporting the vehicle body on said axle by one of the axes thereof, wheels revolubly mounted on the other axis, brake mechanism including brake drums connected to the wheels, with means for operating said brake mechanism, said axes being in such relative positions that when the brakes are applied the axle tends to turn and to lift the vehicle body with it.

2. In a two-wheeled draft vehicle, the combination with the vehicle body of an axle, means supporting the vehicle body on said axle, cranks with extensions on the ends of the axle, wheels revolubly mounted on said cranks, brake mechanism including brake drums connected to the wheels and carried by the cranks and extensions thereof, and mechanism for operating the brake mechanism, the cranks and extensions being so arranged that the vehicle turns on an axis lower than the axis of rotation of the wheels and when the brakes are applied the axle tends to rotate and lift the vehicle with it.

3. A two-wheeled draft vehicle comprising a vehicle body, an axle carrying the vehicle body, wheels revolubly mounted on said axle, said axle having two axes, the vehicle turning on one axis and the wheels rotating on the other axis, a brake drum mounted on one of said wheels and turning with and on the same axis as the wheel, a brake band passing around said brake drum, a double-armed lever pivotally supported on said axle, and having one arm connected to the brake band, and mechanism connected to the other arm of said lever for applying and releasing the brake band.

4. In a two-wheeled draft vehicle the combination with a vehicle body of an axle supporting the vehicle body, cranks with extensions arranged at the ends of said axle, wheels rotatably mounted on said cranks, a brake drum carried by each wheel, a rocking shaft carried by the axle, levers keyed to said rocking shaft, brake bands working on said brake drums and connected to said levers, and mechanism for rocking said shaft for applying and releasing the brake bands.

5. In a two-wheeled draft vehicle the combination with a vehicle body of an axle supporting the vehicle body, cranks with extensions arranged at the ends of said axle, wheels rotatably mounted on said cranks, a brake drum carried by each wheel, a rocking shaft carried by the axle, levers keyed to said rocking shaft, brake bands working on said brake drums and connected to said levers, a lever arm on said rocking shaft and mechanism for operating said lever arm, said lever arm being so proportioned that when the brakes have been applied the rising movement of the vehicle axle tends to take off the brakes so that the braking pressure is automatically proportioned to the load.

CHARLES HOSKING.